Dec. 10, 1968   G. S. SPERTI   3,415,249
SUPPOSITORY
Filed Jan. 7, 1966

INVENTOR
GEORGE S. SPERTI,

BY Yungblut, Melville, Strasser and Foster
ATTORNEYS

United States Patent Office 3,415,249
Patented Dec. 10, 1968

3,415,249
SUPPOSITORY
George S. Sperti, Cincinnati, Ohio, assignor to Stanley Drug Products, Inc., Portland, Oreg., a corporation of Oregon
Filed Jan. 7, 1966, Ser. No. 519,389
9 Claims. (Cl. 128—271)

ABSTRACT OF THE DISCLOSURE

A suppository comprising a first and a second body. The first body consists essentially of a suppository base, an agent for the stimulation of cellular respiration and an agent for promoting cellular proliferation. The second body consists essentially of a vehicle and an anesthetic. The second body is joined to the first body and is exposed at the surface thereof, the second body being of such character as to become liquefied and to be distributed prior to the softening and distribution of the first body.

---

This application has to do with suppositories used primarily in the treatment of hemorrhoids. There have hitherto been manufactured and marketed suppositories having a base of cocoa butter and containing a cellular respiration stimulating factor and a factor promoting cellular proliferation. Excellent results have been had in the use of these suppositories because the named materials are particularly effective in promoting the healing of torn or irritated mucous membranes. While the respiration stimulating factor and the cellular proliferation factor have a certain germicidal action in combination, it has hitherto been suggested that a small quantity of germicide be incorporated in the suppositories.

Because of the pain frequently connected with hemorrhoidal lesions, attempts have been made to incorporate a local anaesthetic in the suppositories. These attempts have not been fully satisfactory because the respiratory stimulating factor and the anaesthetic have a tendency toward mutual neutralization.

It is an object of this invention to provide a structure and a means permitting the incorporation of a local anaesthetic in suppositories of the type referred to without encountering the last mentioned difficulty.

This and other objects of the invention which will be set forth hereinafter or will be apparent to one skilled in the art upon reading this specification, are accomplished in that structure and by that procedure of which certain exemplary embodiments will now be disclosed. Reference is made to the accompanying drawings wherein.

Figure 1:
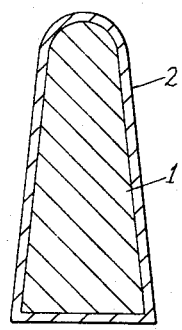
FIGURE 1 is a sectional view through a suppository embodying the invention.

The respiration stimulating factor is a material, organic in origin and complex in nature, derived by extraction processes from yeast or from certain animal tissues such as beef spleens. The processes by which such respiration stimulating factors are extracted, purified and concentrated may be found in U.S. Letters Patents in the name of the present inventor, Nos. 2,320,478, 2,320,479 and 2,239,345. U.S. Letters Patent No. 2,239,345 also described the preparation of materials promoting cellular proliferation. It has been found, however, that a concentration product of fish liver oil serves excellently as a material for promoting cellular proliferation, which is inclusive of the processes of healing and growth. U.S. Letters Patent No. 2,320,479 also discloses an ointment containing a cellular respiration factor and a cellular proliferation factor, which ointment has proved especially valuable in the treatment of burns and other skin lesions. The commercial suppositories above mentioned are generally of the formulation set forth in U.S. Letters Patent No. 2,320,479 excepting that the active ingredients are incorporated in a suppository base rather than in an ointment base. Suppositories may be made using various bases; but a commonly used and entirely satisfactory base is a cocoa butter or similar fatty substance having a melting point approximately that of the normal body temperature, so that the suppositories when in use will melt comparatively slowly with a distribution of the medicaments they contain on the mucous membranes over a substantial period of time. It will be understood that the suppository base can be modified in known ways so as to control the melting point. Some suppositories should be kept, prior to use, under conditions of refrigeration, others do not require this precaution.

As to the germicidal substances included in the suppository, use is generally made of relatively non-irritating germicides, bacteriostats or bactericides of which many are available. The mercuric germicides are available but have some tendency toward the production of irritation. The parabens such as methyl or propyl paraben, are available and are less irritating. Other germicides may be used such as those of the nature of hexachlorophene; but the nature of the germicide does not constitute a limitation on the invention.

The local anaesthetics to which this invention is addressed include such substances as those sold under the name benzocaine (ethylparamino benzoate), those sold under the name dibucaine, nupercaine, metycaine, piperocaine and the like, there being a large group of available local anaesthetics but as has been indicated above, to incorporate such anaesthetics in the body of the suppository is essentially ineffective because of the mutual neutralization of the activity of the several substances involved.

It has, however, been discovered that if the anaesthetic can be distributed over the surfaces of the mucous membranes first, before the substance of the commercial suppositories hertofore mentioned is allowed to act upon the same membranes, the mutual neutralization set forth above will not occur. The reasons why this is so are not entirely clear. But in accordance with the practice of this invention, it has been found possible to secure relief from pain, itching and other forms of irritation with a local anaesthetic without altering the response of the cells of the mucous membranes to the combination of the respiratory stimulation factor and cellular proliferation factor which have rendered the commercial suppositories so effective in the treatment of hemmorrhoids.

It has further been discovered that it is possible to combine the substance of the commercial suppositories with an anaesthetic in a suitable vehicle but without encountering any such diffusion of the substances into each other as would prevent the attainment of the objects of this invention. Finally it has been found possible to produce a single structure, usable as such, which nevertheless permits the initial treatment of the mucous membranes with the anaesthetic, followed by the treatment of these same membranes with the healing substances characteristic of the commercial suppositories to which reference has been made.

FIGURE 1 illustrates a successful structure for this purpose. There is illustrated a suppository having a core 1 which for illustrative purposes may be considered to have a base of cocoa butter or the like containing the respiration stimulating material, the material for the promotion of cellular proliferation, and if desired, a germicide. The structure of FIGURE 1 is characterized by an overcoating 2 containing the chosen anaesthetic or mixture of anaesthetics in a suitable vehicle or carrier.

Since the anaesthetic should reach the mucous membranes first, it is necessary that the coating 2 be melted or dissolved before the body 1 of the suppository.

This can be accomplished in several ways. If the body 1 of the suppository is made on a base of cocoa butter or the like, the coating 2 may be made on a similar base; but in this instance the base for the coating 2 should have a somewhat lower melting point than the base for the body 1 of the suppository. This will insure that the material represented by the coating 2 will melt and become distributed over the mucous membranes before the body 1 of the suppository melts.

The structure described in the preceding paragraph is completely effective; but since the base of the suppository body 1 must melt at body temperature, the base of the coating 2 should have a substantially lower melting point. This may make it advisable to store the suppositories prior to use under cool conditions or conditions of refrigeration.

A similar effect may be obtained without this disadvantage by using as the vehicle for the coating 2 a hydrophylic substance capable of being dissolved or dispersed by the moisture existing in or on the mucous membranes. There are a number of hydrophilic substances which may be employed; but a base of polyethylene glycol of suitable consistency at normal temperatures will be found entirely satisfactory. In known ways, the degree of polymerization of the polyethylene glycol may be so controlled that its melting point is as high as or higher than the melting point of the cocoa butter or other fatty substance forming the body of the suppository.

When the suppository is used, the coating of polyethylene glycol or similar hydrophilic substance (containing the anaesthetic) will dissolve and become distributed over the mucous membranes before the fatty body of the suppository melts and becomes distributed. The use of a hydrophilic coating is further advantageous in that it tends to prevent the diffusion of substances from the coating into the body of the suppository and vice versa.

It is possible to locate a thin barrier layer over the body of the suppository prior to the application of the coating 2. Such a barrier layer might be a layer of moisturized gelatin. However it has not generally been found necessary to provide a barrier layer, and it adds to the expense of the structure.

The structures of FIGURE 1 are essentially manufactured in stages. The bodies 1 of the suppositories are first produced. They are then impaled upon points in a machine and are dipped into a coating of the hydrophilic substance 2. The hydrophilic substance will be substantially in a liquefied form and the use of heat for liquefaction is contemplated. If the temperature of the hydrophilic substance is higher than the melting point of the body 1, the suppositories may be chilled prior to dipping. In this event a quantity of the hydrophilic substances making up the coating 2 will be frozen against the outer surfaces of the suppositories.

In general, in the manufacture of the structures of this invention, the amount of anaesthetic employed will vary between about 1% and about 35% of the total weight of the finished suppositories, depending on the strength of the anaesthetic used.

Figure 2:
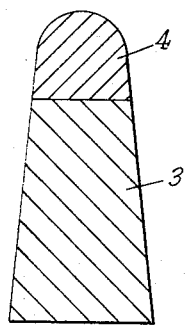
FIGURE 2 is a longitudinal sectional view through a suppository having a modified construction.

Another effective structure is illustrated in FIGURE 2 where the suppository has a somewhat foreshortened body 3 and wherein a fore-portion of the suppository consists essentially of a desired quantity of anaesthetic in a vehicle or medium which can be either fatty in nature of hydrophilic as desired. The fore-portion of the suppository is joined to the body thereof by the natural adhesion of the substances. In making up the structure of FIGURE 2, it is possible to manufacture first the foreshortened bodies 3 of the suppositories and then in a separate mold cast against them the fore-portion containing the anaesthetic.

This may be done by pouring the anaesthetic in the mold against the body of the suppository or by employing injection molding techniques for the formation of the forepart 4.

Other ways of manufacture are also possible. The bodies of the suppositories may be formed continuously in an extrusion mold having apparatus of such character as to cause the extruded body column to be coated with a continuous layer of the substance containing the anaesthetic. The rod-like result of this operation may be cut apart into the individual lengths desired for the suppositories, and the forward ends of the suppositories may be shaped in any way desired to facilitate the use of the suppositories.

The embodiments of the invention in which an exclusive property or privilege is claimed are defined as follows:

1. In a rectal suppository, a body consisting essentially of a suppository base, an agent for the stimulation of cellular respiration, and an agent capable of promoting cellular proliferation, and a second body consisting essentially of a vehicle and an anaesthetic substance, said second body being joined to said first body and being exposed at the surface of said suppository, said second body being of such character as to become liquefied so as to be distributed upon mucous membranes when said suppository is in use prior to the softening and distribution of said first body.

2. The structure claimed in claim 1 wherein said second body forms a coating on said first body.

3. The structure claimed in claim 1 wherein said first body comprises a fatty base and wherein said second body comprises a fatty base having a lower melting point.

4. The structure claimed in claim 1 wherein said first body comprises a fatty base and wherein said second body comprises a hydrophilic vehicle, soluble in water.

5. The structure claimed in claim 1 wherein said second body is substantially in axial alignment with said first body.

6. The structure claimed in claim 1 wherein said second body contains an amount of anaesthetic substantially equivalent to about 1% to about 35% by weight, of the suppository structure.

7. A rectal suppository comprising a first body consisting essentially of a fatty base, a cellular respiration stimulating agent and a cellular proliferation agent, and a second body consisting of a vehicle and an anaesthetic dispersed therein, said bodies being joined together and the said second body being capable of liquefication under conditions of use within a shorter space of time than said first body.

8. The structure claimed in claim 7 wherein said first body comprises a fatty vehicle having a melting point substantially the same as normal human body temperature, and wherein said second body has a vehicle of polyethylene glycol.

9. A process for the treatment of hemorrhoids which comprises first treating the mucous membranes in and about the said hemorrhoids with an anaesthetic substance dispersed in a liquefiable vehicle and thereafter treating the same mucous membranes with a dispersible fatty vehicle containing a cellular respiration agent and an agent capable of promoting cellular proliferation.

References Cited

UNITED STATES PATENTS 2,696,456  12/1954  Hetterick _____ 167—64

ADELE M. EAGER, *Primary Examiner.*

U.S. Cl. X.R.

167—64